US008751580B2

(12) United States Patent
Owen

(10) Patent No.: US 8,751,580 B2
(45) Date of Patent: Jun. 10, 2014

(54) REAL-TIME COMMUNICATION AND INFORMATION COLLABORATION SYSTEM

(76) Inventor: Thomas Owen, Keiraville (AU)

(*) Notice: Subject to any disclaimer, the term of this patent is extended or adjusted under 35 U.S.C. 154(b) by 0 days.

(21) Appl. No.: 12/803,868

(22) Filed: Jul. 7, 2010

(65) Prior Publication Data
US 2013/0198290 A1  Aug. 1, 2013

(51) Int. Cl.
G06F 15/16 (2006.01)
H04L 29/06 (2006.01)

(52) U.S. Cl.
USPC ........... 709/205; 709/229; 709/202; 709/225; 709/217; 709/227; 709/204; 713/156; 713/176; 719/317

(58) Field of Classification Search
USPC ......... 709/205, 223, 218, 229, 202, 217, 227, 709/204
See application file for complete search history.

(56) References Cited

U.S. PATENT DOCUMENTS

| 7,171,441 | B2 * | 1/2007 | Shiouchi et al. | 709/202 |
| 7,581,012 | B2 * | 8/2009 | Shiouchi et al. | 709/229 |
| 7,881,976 | B2 * | 2/2011 | Dayton et al. | 705/26.1 |
| 2002/0029278 | A1 * | 3/2002 | Shiouchi et al. | 709/229 |
| 2002/0078154 | A1 * | 6/2002 | Djennane et al. | 709/205 |
| 2003/0018792 | A1 * | 1/2003 | Shiouchi et al. | 709/229 |
| 2004/0019683 | A1 * | 1/2004 | Lee et al. | 709/227 |
| 2004/0093277 | A1 * | 5/2004 | Faerch et al. | 705/26 |
| 2007/0050448 | A1 | 3/2007 | Gonen et al. | |
| 2007/0136423 | A1 * | 6/2007 | Gilmore et al. | 709/204 |
| 2009/0089177 | A1 * | 4/2009 | Dayton et al. | 705/26 |

FOREIGN PATENT DOCUMENTS

WO  03/041033 A1  5/2003

* cited by examiner

Primary Examiner — Jude Jean Gilles
(74) Attorney, Agent, or Firm — Bryan G. Pratt; Holland & Hart, LLP

(57) ABSTRACT

A method and apparatus for real-time communication and collaboration including visual modelling and creation of virtual collaboration regions in which users come together and see the media other users have to decide how they will communicate via use of compatible communication devices or common or connected software platforms.

9 Claims, 7 Drawing Sheets

REAL-TIME COMMUNICATION AND INFORMATION COLLABORATION SYSTEM

CROSS-REFERENCE TO RELATED APPLICATIONS

This application claims priority to PCT Application No. PCT/AU2009/000045 filed on 15 Jan. 2009, which claims priority to Australian Application No. 2008900173 filed on 15 Jan. 2008.

FIELD OF THE INVENTION

This invention relates to distributed communication networks for sharing information, and in particular, to a real-time communication and collaboration system for connecting people and sharing information across multiple protocols.

Whilst the invention can be applied to any suitable electronic device for data/voice communication and information sharing, for convenience sake it shall be described herein in terms of a real-time communication and collaboration system for connecting people over a distributed communications network, such as the Internet.

BACKGROUND TO THE INVENTION

Since the telegraph, there have been an ever increasing number of devices that accomplish remote, electronic, real-time participation in collaborative tasks. The proliferation of such media these devices make available will increase the complexity of managing electronic collaboration. The following tasks in communication systems will therefore become more onerous to manage as time advances:
- device connection semantics;
- contact lists;
- media transience/limited term use;
- robustness and fault-tolerance
- user identification and affiliation;
- user and collaboration activity logging;
- mixed media collaborations;
- security and privacy;
- social interaction and teamwork.

Communication over the Internet has become a popular social and business tool. More and more people are communicating over the Internet through various means, including Internet forums, instant messaging systems or, more recently, Voice Over Internet Protocol (VoiP) programmes.

Internet forums allow a user to review a number of grouped topics stemming from a parent subject. Topics range from television/movies, music, sports, computers, professional interest and many more. The disadvantage with forums is that the media is static, and they generally do not provide the opportunity for immediate feedback. Often a user will make an entry onto a forum and leave, returning at a later time to review any replies that have been received in response to their input for a discussion. Also forums can become cluttered with discussion topics remaining on the forum page long after any of the members have finished discussing the topic.

Instant messaging (IM) is a popular medium for communicating over the Internet. It provides a more real-time discussion, as people involved in a discussion have to be at their computer making use of the programme to engage in communication. This form of communication is generally a one on one experience, unless other members in a user's "friends list" are also online and willing to join the conversation. Whilst it is possible to add people to your friends list, a search is required so not all users who are using an IM service are automatically visible to a user of an IM programme. These systems allow users to consciously think about a reply before they type their comments and send it to a recipient. The sole requirement of a keyboard can also provide problems for people who have trouble typing or are illiterate.

Recent developments in Internet programmes have resulted in the creation of programmes using VoiP, allowing people to communicate with each other over the Internet. There are VoiP programmes available, which operate in a similar manner to a telephone. Any multi-line connection that is available requires all users to have contact details pertaining to the other parties for contact to be initiated and a multi-line conversation to take place.

Accordingly, it is an object of the present invention to overcome or substantially ameliorate the disadvantages of the prior art by providing a real-time communication and collaboration system for connecting people and sharing information across multiple protocols.

SUMMARY OF THE INVENTION

The present invention provides a real-time communication and collaboration system including:
- a service provider;
- at least one server having at least one computer/communications device connected thereto over a distributed communications network;
- a plurality of users having at least one chip and participating in at least one client collaboration;
- at least one associated software interface which can be accessed and operable within a client collaboration space; and
- a software platform that allows users to visualise and participate in the network of connected users whereby the system provides a means for connecting people and sharing information across multiple protocols.

It is preferred that there is a plurality of servers which are adapted to be interconnected with each other to define an agent collaboration in which client collaborations can form via a networked connection to the server. Because these servers communicate to each other, they are called agent devices when referring to the agent collaboration. They act more as servers with relation to the client devices that connect to them.

It is preferred that each communications device is adapted to be associated with the user's account and can have at least one media profile.

It is preferred that each user can have a user account.

It is further preferred that the account profile is adapted to maintain record of details including, but not limited to, user details, account details, access and security permissions, details of associated communication devices and/or media profiles and any other suitable information.

It is preferred that each client device may have provided an agent collaboration view.

Each client collaboration is governed by a collaboration mode, which identifies which user can be privy to its activity, and whether or not the user can participate. A collaboration mode is a combination of limiting constraints applied to an account, account profile, agent collaboration, connection, or additional limiting constraints applied to the client collaboration by its owner.

It is envisaged that a representation of other user's accounts (a chip) can be located and imported into a client device's view by a user for collaboration with other users.

It can be seen that the invention provides a way to centralise and abstract the coming together of people to form impromptu collaborations through any media they may choose to use. The system should be able to factor out the similarities in managing collaborations from the media that are used, and provide the opportunity to display an identical and intuitive interface to the user regardless of which medium is being used. The system should be able to handle any future media, without modification to the system's core functioning. Where authorised, the system should also be able to control user movement and generate media activity logs for user interaction based primarily with their affiliation.

The novel features that are considered characteristic of the invention are set forth with particularity in the appended claims. The invention itself, however, both as to its structure and its operation together with the additional object and advantages thereof will best be understood from the following description of the preferred embodiment of the present invention when read in conjunction with the accompanying drawings. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Description of Preferred Embodiments is not intended to indicate a desire to invoke the special provision of 35 U.S.C. §112, paragraph 6 to define the invention. To the contrary, if the provisions of 35 U.S.C. §112, paragraph 6, are sought to be invoked to define the invention(s), the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. §112, paragraph 6. Moreover, even if the provisions of 35 U.S.C. §112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

BRIEF DESCRIPTION OF THE DRAWINGS

In order that the invention can be more readily understood an embodiment will be described by way of non-limiting example with reference to the drawings wherein.

Figure 1:
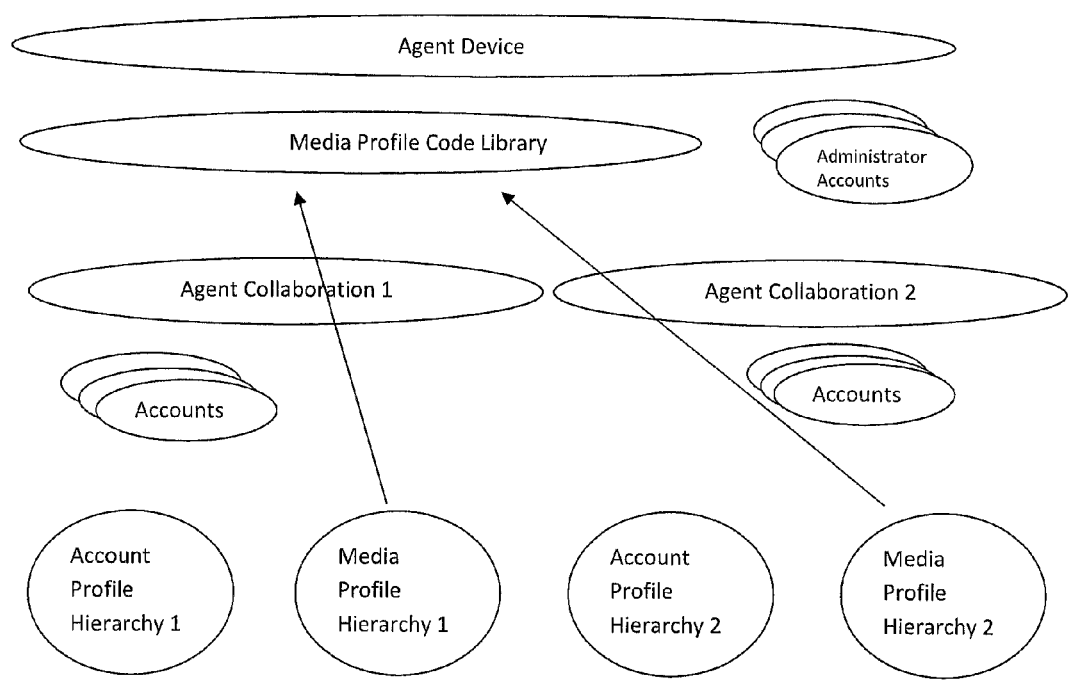
FIG. 1 is a diagrammatic view of a structure of a real-time communication and information collaboration system in accordance with an embodiment of the invention.

DESCRIPTION OF A PREFERRED
EMBODIMENT OF THE INVENTION

In this preferred embodiment, the invention provides a real-time communication and collaboration system for connecting people and sharing information across multiple protocols. The invention shall be described herein in terms of a real-time communication and collaboration system for connecting people over a distributed communications network, such as the Internet. However, it is envisaged that the invention could also be modified to be utilised with any suitable electronic device for data/voice communication and/or information sharing. The concept of the invention revolves around the inclusion of dynamic groups of users, which shall be referred to throughout the specification as "client collaborations". Our system is known as a Clique Space™ within which these client collaborations (or Cliques™) exist. It is envisaged that the features and components of the system can be varied as desired to suit different people/organization requirements and/or applications.

The major components of the system are:
1.1. client device;
1.2. user;
1.3. agent device;
1.4. agent collaboration;
1.5. media profile;
1.6. client collaboration;
1.7. account; and
1.8. account profile.

The client device is any tangible piece of hardware or intangible software system that can participate in a client collaboration. Client device interaction is controlled in an agent collaboration though an active affiliation that appears in a client collaboration as a participant. An active affiliation associates a user's account, a media profile, and an account profile using an affiliation and a connection as intermediary administrative constructs.

The client-side code that implements the agent collaboration interface with the client device is an enabling component of the agent collaboration. The concept of the client device that performs some form of collaborative endeavour is a context in which an agent collaboration operates, and is an enabling component of the agent collaboration.

The user is an individual who asserts individual responsibility. Commonly, one user would possess one agent collaboration account. Means of guaranteeing user authenticity are not covered in this specification; this is assumed to be handled by some client device-specific authentication process used to obtain a connection. A user is given in this specification as a context in which agent collaboration operates.

The agent device is a running instance of the agent collaboration software implementation. Agent collaboration aware client devices can connect to an agent device, and one or more agent devices can participate in one or more agent collaborations.

In a recursive manner, an agent device can be considered a client device so that viewing an agent collaboration as a client collaboration provides a way of controlling an agent collaboration environment. The agent device as both provider of the Clique Space environment, and as a type of client device in its own right, is an enabling component of the real-time Communication and Information collaboration system of the invention. An agent collaboration can be considered and viewed as a client collaboration where the agent devices are the participants. The media profile implementing the protocol supported by the agent collaboration is the mode.

The Media Profile hierarchy is rooted at the media profile responsible for exposing the agent collaboration functionality. This media profile provides enabling constraints that allow parameters related to the functioning of an agent collaboration (including media profiles themselves) to be varied in the same way as other client device specific parameters.

The agent collaboration can represent itself within itself, or within another agent collaboration as a client collaboration where the agent devices are the participants. This client collaboration permits administration of the agent collaboration or clique space. Such a client collaboration can form or disband; additional agent devices can connect, and existing agent devices can leave. The Participants may not be identical implementations of the real-time Communication and Information collaboration system of the invention, but a common Media Profile—the protocol used in the agent collaboration—will expose the base functionality of the agent collaboration to which all the agent device's participants will abide.

FIG. 1 is a representation of the agent device architecture. Agent device administrator accounts are declared outside of an agent collaboration and use the agent device administrator media profile. In this diagram, the agent device is shown to have two agent collaborations. This is an example only; an agent device may be a member of zero or more agent collaborations. An agent device that is a member of more than one agent collaboration may facilitate a federation.

Within both agent collaborations are maintained separate account profile and media profile hierarchies and accounts. The media profile hierarchy is rooted at the agent device administration media profile node. Administrators have separate accounts at the administration level to the ones they may possess in either agent collaboration. That is, a user who has an agent device administrative account will not be able to participate in an agent collaboration unless they also possess a separate account in that agent collaboration.

The agent device as both provider of the agent collaboration environment, and as another type of client device in its own right, is an enabling component of the agent collaboration.

An agent collaboration (or client collaboration space) is the virtual environment in which users participate in collaborations with client devices. Physically, this environment is implemented as a network of one or more agent devices. The network can be a peer-to-peer environment in which the client device hardware, also hosting an agent device, maintains the agent collaboration themselves. The agent collaboration is the medium over which changes in client device state are communicated by, and to all (agent and client) devices.

One agent collaboration may federate with another, so that client collaborations that form in one might be able to include participants from another. A client collaboration that contains participants from multiple agent collaborations can be said to span multiple agent collaborations. Client collaboration spanning is achieved by one or more participants who actively affiliate a client device to more than one mutually federated agent collaborations simultaneously.

A single agent collaboration is able to span more than one physical network topology. Hence, an agent collaboration need not be considered bounded by a physical network topology. As the collaboration semantics are identical, less administrative work may be necessary to span an agent collaboration over multiple network topologies than is required to federate multiple agent collaborations. An agent collaboration can be considered and viewed as a client collaboration where the client devices (the agent devices) supporting an appropriate media profile are the participants.

Media profiles facilitate communication between the agent collaboration and the client devices that are operated from it. Each client device would possess client side code necessary to interface with at least one media profile before it could be connected to an agent collaboration through a user's account. Each media profile would identify a known set of interaction parameters (a medium, composed of one or more enabling constraints) to the agent collaboration.

A media profile allows a collaboration's media-specific behaviour to be reflected in the agent collaboration, even to those connections that possess a client device that does not use a particular media profile. Hence, media profiles associated with one user can be communicated to all other users in an agent collaboration. In this way, a common medium can be selected between users who wish to collaborate. Media profiles could be registered to operate within one or more agent collaborations so that client collaborations can span multiple agent collaborations.

Although it is envisaged that media profiles are added and removed by the agent collaboration's administration, other affiliations could update the media profile hierarchy if this was permitted by the agent collaboration's administration. Limiting constraints would ensure that the media profile administrator is typically any affiliation that is the same account profile as, or an account profile superordinate to, the account profile that installed the media profile.

The media profile hierarchy is rooted at the media profile responsible for exposing the agent device functionality. This media profile provides enabling constraints that allow parameters related to the functioning of all agent collaboration components (including media profiles themselves) to be varied in the same way as client device specific parameters. The media profile is an enabling component of the agent collaboration for which the patent application is being sought.

The system has provided a service provider who is adapted to provide a system, which allows people across multiple protocols to be connected in real-time for participation in collaborative tasks, communication and the sharing of information. The system has provided at least one server, which at least one user can access via a computer directly or remotely connected over a distributed communications network, such at the Internet, or any other suitable network. In a preferred embodiment, there is a plurality of servers, which, as agent devices, are adapted to be interconnected with each other to define an agent collaboration in which client collaborations can form via a networked connection to the servers. These client collaborations model, control, and provide a media activity auditing stream for the actual collaborations in which groups of client devices may be involved.

In a further embodiment, the system can have provided at least one communications device, which a user can utilise to connect to a server within the client collaboration space. Each communications device is adapted to be associated with the user's account and can have at least one media profile. The user selects an agent collaboration to connect a client device to, and the agent collaboration owner selects which agent device will take the actual connection. The media profile is established at the time of connection. The media profiles are used to communicate the capability settings of the media and are generally provided to agent collaboration administrators by vendors when a particular media is developed. The media profile allows device configurations to be declared for common devices and be categorised to permit relationships for the sharing of media. It is envisaged that the media profiles may not be altered. However, it is envisaged that the media profile can be replaced or discontinued.

The user can be an individual, a group of users, a company or any other suitable entity. Each user can have a user account, client collaboration account. The account can be associated with at least one account profile. The account profile is adapted to maintain record of details including, but not limited to, user details, account details, access and security permissions relating to the user who operates devices from a particular account, details of associated communication devices and/or media profiles and any other suitable information. It is envisaged that permissions can be provided so that certain information stored within the accounts, such as biographical information for users, can be accessed by others. The account profile is administered by the user/organization who owns the profile and/or the service provider. The profile can be used to control most aspects of client collaboration formation and can be activated or deactivated by a user by allowing or denying access/representation to other users. A user may operate their account from different devices logged in at different times, or at the same time if logged onto multiple devices simultaneously.

In a preferred embodiment, it is envisaged that a user can only be a member of one profile at a time for the simplified tracking of a user's activities. It is envisaged that a user can be a temporary member of a profile whereby a timer will start and stop each time the user is participating under that particular profile. In a further embodiment of the invention, it is envisaged that the system is able to generate and produce at least one report to summarise or analyse any suitable aspect of the system i.e. the name of the users and duration of communication with those users. It is envisaged that detailed activity, such as recording of a partial or entire spoken word conversation, will need to be performed by some recording device attached to the client device.

Each user has provided their agent collaboration view. The agent collaboration view is visible to the user via the display screen of the computer/electronic client device upon connection to the client collaboration space. The user can control the security settings of their account over their client collaboration space, allowing the user to decide which other users they are interested in collaborating with.

It is envisaged that one client device's agent collaboration view will be opaque to another device unless otherwise permitted.

Each client collaboration is governed by a collaboration mode, which identifies which users can be privy to its activity, and whether or not these users can participate. A collaboration mode is a combination of limiting constraints applied to an account, account profile, agent collaboration, connection, or additional limiting constraints applied to the client collaboration by its owner.

It is envisaged that a notification can be provided to a client collaboration, or one or more members within the client collaboration, if the number or identity of listeners change.

The agent collaboration may provide multiple ways for a user to open a view on the client collaboration space. One way can be to connect via a web front-end interface provided by the agent collaboration administrator. Another way can be through client software operating on a device that is connected to the client collaboration space. This client software might connect over the Internet to the agent collaboration, or use an alternate protocol specified in the media profile for that device which, alternatively, allows the device to use its own protocol and physical network infrastructure to communicate with the agent collaboration.

A client collaboration is a group of participants, governed by a set of constraints, and using client devices that are governed ultimately by the medium or media through one specific media profile.

The individual responsible for initiating the client collaboration is appointed the client collaboration owner. Typically, the client collaboration owner may determine the client collaboration's media profile and associated medium or media (collections of enabling constraints). A client collaboration owner may also have the ability to apply limiting constraints to the client collaboration. Ownership may cede to another participant if the owner leaves. The client collaboration is an enabling component of the agent collaboration.

It is possible that a client collaboration can span more than one agent collaboration. This is a designed intention. The client collaboration participant therefore, is an abstraction, which provides the structural convenience necessary for the expression of this intention. Client collaborations contain participants, which refer to an active affiliation in the agent collaboration to which a user has obtained a connection. Desired information about the participant can be communicated to other agent collaborations amongst which also have participants in a client collaboration.

Typically, the user can query the participant for details relating to the underlying account or client device regardless of whether the participant is a member of the same agent collaboration to the account of the user making the request. If the participant is from a foreign but federated agent collaboration, the said foreign agent collaboration may refuse to divulge selected identifying information about the participant.

One participant of the client collaboration is given the label client collaboration owner to signify that they are responsible for the client collaboration's existence. The owner's responsibilities to the actual collaboration through which the client collaboration is modelling will vary with the medium.

This concept of an owner is also modelled in the agent collaboration. In the case of managing the agent collaboration, the owner is an agent device that must be responsible for initiating message cascades, which inform other members of changes in the agent collaboration. If an agent device wishes to join the agent collaboration, or one wishes to leave, it informs the agent device designated as the owner of its intentions. If any agent device that is not the designated agent collaboration owner fails to respond, the owner will determine whether they should remain in the collaboration. If the owner fails to respond, the remaining agent devices of an agent collaboration will arbitrarily figure out which of the remaining agent devices will be the new owner, or will have to disband the agent collaboration as appropriate for the agent collaboration's policy.

In the case of client devices, a client collaboration owner has the responsibility of maintaining the media profile (and hence the associated media) and limiting constraints for the whole client collaboration. Other participants, unless permitted by the client collaboration owner, generally do not have this level of control.

In the case of both the agent collaboration and the client collaboration, ownership responsibility is vested in one agent device instance, though this responsibility can cede when the owner chooses no longer to be registered as such, or the agent device is for any reason, failing to respond.

A client collaboration listener as a type of participant, can be able to eavesdrop on a conversation if this is possible over the media profile, and permitted though the client collaboration's limiting constraints. Listeners do not of themselves constitute a client collaboration, and a client collaboration cannot form where the only members are listeners. Listeners do not stop a client collaboration disbanding once the participants leave. While an active affiliation might only be able to participate in one client collaboration at a time, it may also be listening in zero or more client collaborations. An active affiliation may not necessarily have to be a participant in one client collaboration to be a listener in others.

Listeners are a powerful way to allow authorised eavesdropping on one or more simultaneous collaborations happening between users within an account profile. The enabling of client collaboration listeners is an enabling constraint that is specific to the operation of a particular media.

Media profiles encapsulate their own set of enabling constraints, collectively known to one media profile as a medium, and referred to as a collection of media with regard to the hierarchical plurality of the media profiles. A media profile's own functionality can be compatible with subordinate media profiles in the hierarchy. In this case, a medium may need to alias some or all of the enabling constraints of subordinate media profiles to operational parameters of a newly installed media profile if some, or all operational parameters are sufficiently covered by subordinate media.

An agent device can expose its own functionality inside an agent collaboration as a client device. An appropriate media profile that is common among all agent devices, which make up this agent collaboration, becomes the media profile used in the client collaboration. The common media profile exposes the agent collaboration's functionality through a set of enabling constraints.

Limiting constraints can be derived from at least five sources: accounts, account profiles, the agent collaboration, connections (to express connection-specific limitations) or can be asserted by the client collaboration owner (or even owner-appointed moderators should a particular media profile permit a concept of moderators) after the client collaboration is formed. That is to say, a limiting constraint may limit the action of the enabling constraint. Limiting constraints may also limit the action of various functional parameters of the agent collaboration. The client collaboration's mode is determined by the application of limiting constraints from all sources over the chosen media profile.

An agent collaboration, being a collection of two or more agent devices, can be modelled within itself as a client collaboration in which the agent devices themselves are the participants. This self-referential client collaboration can be controlled through the application of limiting constraints as if this client collaboration were like any other.

An account is a collection of unique characteristics identifying a user. The user logs in through all client devices they wish to use via their account, thereby associating each connected client device with a single account and therefore, a single identifiable user. An account could be registered to operate within one or more agent collaborations.

An account is a non-hierarchical token that discretely identifies an individual to any agent collaboration and agent device in order that this user's use of a system is identified to all other users, themselves so identified. The agent collaboration determines the authenticity of a connection, and thereby the associated account. Hence, the identity of the agent collaboration is as important an attribute to users as the identity of the account.

Account profiles primarily allow affiliate relationships, and may also be used in a controlled environment to audit, control and secure client collaboration formation and users' conduct while participating. Another major function to account profiles is their ability to control user activity within an agent collaboration. Account profiles could be registered to operate within one or more agent collaborations.

For a particular agent collaboration, the account profile hierarchy has a single root at the agent collaboration's administrator account profile. This account profile is distinct from the agent device administrator account profile because multiple agent devices can be a member of an agent collaboration. The account profile of the affiliation that creates a new account profile typically becomes the new account profile's owner.

For an affiliation, an individual account must be associated to one or more account profiles before it can be used in an agent collaboration. To do this, one or more affiliations associate the said account with one or more account profiles.

An affiliation maps a 1:1 association between an account and an account profile. Affiliations for a specific account profile are typically created by an active affiliation with a parent of the said account profile.

When a user attempts to log on to an agent collaboration, the user must establish a connection. A connection maps a 1:1 association between an account and a media profile. Communication between the client device they are using and the agent collaboration establishes which media profile will be used. The user may select a suitable media profile if more than one possibility exists for the client device. Once the media profile is established, the connection is created.

There must be an active affiliation before a user can use their client device to participate in client collaborations from within a particular agent collaboration. The connection they have associated between their account, and the media profile, which is controlling and monitoring the activity state of the client device, must be associated with an existing affiliation.

The association between an affiliation and a connection is called an active affiliation. An active affiliation maps a 1:1 association with an affiliation and a connection. The affiliation and connection would typically be associations involving the same account. Active affiliations also manage user's permissions by aggregating all the limiting constraints for the user's account, the account profile to which one has been affiliated, the agent collaboration within which one has obtained one's connection, and the client collaboration to which one can be a participant.

It is noted that the data model accepts the concept of listeners with the inclusion in the client collaboration component of a single element: a group identifier for each participant. The general condition that determines when a client collaboration must disband is also slightly modified: if all groups so identified contain less than two participants.

A client collaboration chip is an icon that represents a user's account on an agent collaboration view. The icon can be tailored to a suitable look-and-feel context of the client device's medium. A user registers interest in one or more other users' accounts by importing client collaboration chips into one's view of the client collaboration space.

Through a chip thus imported, one user might be able to perform functions that include: enquiring on any identifying detail about another user's account; seeing which connections the other account has available and through which agent collaboration each connection has been made; finding out which affiliations another connection has been made under; or requesting to start or join client collaborations with another user or client collaboration.

It is intended the client collaboration chip be a regular hexagon so the chips can pack together when the viewing context may represent cooperative engagement between users in a client collaboration.

The (client collaboration space) view is a representation of what users see of chip activity. Any client device may provide an agent collaboration view, although a client device needn't supply a view or an ability to interact with an agent collaboration directly to be agent collaboration aware.

It is envisaged that a user who opens a blank view on an agent collaboration would receive a view with one chip on it—one's own. It would be envisaged that a user can import chips in many ways, including: through any of their account profiles; through other chips already imported; or through client collaborations that the user can see on their view. Chips might, for instance, be embedded in web pages for those users who can access the web over a client device so they can be imported into a view.

Chips that are in client collaborations might, in a simple visual display, group together in an enclosing ellipse. Chips that are not participating should stand apart. Listeners would appear inside a client collaboration, though obviously separate from any particular group of participants. Users could primarily join client collaborations already formed by selecting an area inside the ellipse, but away from any of the chips lest an individual chip unintentionally be selected.

An activity stream may be available from an agent collaboration for the purpose of capture by a client device with a suitable media profile and account profile. Normally, an activity stream would not be recorded by the agent collaboration. Rather, a client device that connects to a media profile can be configured with an appropriate set of limiting constraints to capture an arbitrary level of activity stream data.

Since the agent collaboration can be regarded as a client collaboration in its own right, any activity inside and outside the formation of client collaborations can be picked up in the activity stream. This activity might include the issuing of connections, the creation and activation of affiliations, the installation of media profiles, and any other activity that might happen in an agent collaboration.

The activity stream is generated by the agent collaboration, and data is channelled to client devices through a specific media profile. Its output is filtered by the application of limiting constraints on at least five sources: the agent collaboration, connection, account, account profile, and client collaboration.

A user may produce activity stream information in a particular agent collaboration while they have a connection to the said agent collaboration. A user (or maybe just their participant information) may also produce activity stream information on federated agent collaborations when participating in a client collaboration with participants from these federated foreign neighbours.

The system has provided at least one client collaboration chip. The client collaboration chip is shown as a representation of a user's account i.e. an icon. It is envisaged that a representation of the other's accounts can be located and imported by a user. However, this relationship does not need to be reciprocated. Where another user does not have the primary user in their view, and the primary user would like to involve another person in a conversation or other collaboration, the primary user would need to contact the other user to make a request. A request provides a notification to the other user and gives them the opportunity to import the primary user's chip onto their view for participation and/or collaboration. It is envisaged that a user may locate another user using a number of methods including, but not limited to, the following;

Importing chips from access lists of all users who are available in all profiles that the user is a member of;

Making a request to a particular user via their chip for any chips that are available in their view and are willing to divulge; and Asking a client collaboration to divulge its participants (regardless of whether the user is a participant in the client collaboration it made the request from, which can be the subject of rules of the client collaboration, if the client collaboration is moderated).

It is envisaged that the user's own chip can have provided at least one obvious embellishment, which is adapted to make the chip visually different and distinguishable on the user's view of the client collaboration space. Once the user has one or more other chips added to their view, the user can create or join a client collaboration with one or more of the said other users for collaboration by selecting the other user's chip(s) or client collaboration. The user can view the agent collaboration to see other client collaborations form, grow contract and disband in real-time as chips enter and leave client collaborations. In a preferred embodiment, the chips that are participating in the same client collaboration are grouped together and those that are not participating in a client collaboration are shown to be standing apart on their own. The chips and client collaborations can be used to send files and other computerised information between users and accounts. It is envisaged that the compatibility of media, accounts and client collaboration for allowing collaboration can be visually indicated on the user's view via a suitable embellishment. The system can have provided an interrogation functionality that allows a user to determine the compatibility requirements of a chip, client collaboration or embellishment provided.

The system has provided at least one account. Accounts can be members of multiple client collaborations and can have the capability to be logged in one or more times across multiple different computers/devices. This provides a means for enabling users to liaise between two or more client collaborations to overcome media or account profile imposed boundaries which would otherwise prevent members of one client collaboration from communicating directly with those of another. A user can navigate the client collaborations by selecting a chip and deciding which particular client collaboration to display. Alternatively, the user may open a new view on a chip to preserve the existing view. Multiple client collaborations can be used to collaborate over multiple media formats. For example, participants of a client collaboration formed over teleconferencing media may also participate in another client collaboration that has the collaborative use of a computerised whiteboard so that all users will be able to converse and utilise the whiteboard.

The system may have provided at least one client collaboration moderator which is appointed by the collaboration owner to set-up and monitor client collaboration scoped constraints. The facilitator is a client collaboration owner or an administrator appointed by the client collaboration owner. Each client collaboration may only have one owner who is a participating user. The client collaboration owner is determined at the time of initial formation of the client collaboration. However, if the owner of the client collaboration is not the last member to leave, it is envisaged that that system will appoint a new member to be the client collaboration owner. This cycle would continue until the client collaboration is disbanded.

The system is adapted to have a plurality of software interfaces that allow the agent collaboration to inter-operate with client devices.

In practice, a user will usually access the system by opening a view on their computer or electronic device. The user will be able to view the agent collaboration on their client device's display screen. The first chip that will be visible will be one belonging to the user themselves. The user can then search and import other user's chips onto their screen and create or join various client collaborations. The user will be able to view chips entering in and out of client collaborations and see client collaborations being formed, growing, contracting and being disbanded. The real-time communication and collaboration system allows people to come together and see what media other users have to decide how they will communicate via use of compatible communication devices. The system can be associated with at least one existing software platform that allows a user to communicate and collaborate using compatible software and communication devices. For example, a user wishing to communicate with another user having Skype and MSN software and connected microphone and camera devices, may choose to do so depending on the compatible media they share.

Example 1

As shown in FIGS. 2 to 5 it is clear that the core of this system remains agnostic of the devices' operational semantics while communicating operational semantics to the other users in a way that is intuitive and universal. The system facilitates the provision of an intuitive and universal representation of user activity to all users regardless of which media they are using. This representation is rendered appropriately over the user interface of the particular device.

This system allows independent audit and control constraints to be selected that may depend ultimately but not exclusively on a domain administrator's requirements. The individual's right to privacy and transparency is preserved by allowing them to accept or decline a request to collaborate with others from the same, another, or no agent collaboration. The system is robust and configurable enough to withstand and prohibit errant and malicious behavior.

The system provides the foundation for an abstract and highly adaptable environment. This environment realizes device and user behavior in the specific circumstances as dictated ultimately by the administrators of a particular clique space domain.

Figure 2:
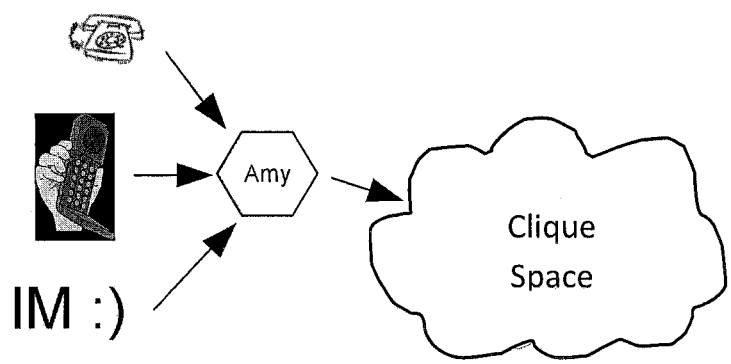
FIGS. 2, 3, 4 and 5 are a diagrammatic view of an operative action of a real-time communication and information collaboration system in accordance with an embodiment of the invention.

A clique space is the virtual environment in which users, having a probable need to collaborate in an organized and controlled way, register themselves. Physically, this can be implemented as a cluster of one or more agent devices. Users connect multiple client devices to a clique space through a single user's account, as depicted in FIG. 2.

Because each clique space is an administrative domain, collections of clique spaces can be federated so to cooperatively form a universe of interconnected clique space domains. Individual clique spaces can be administered by individual organizations to provide levels of audit and control that would suit the organizations needs to any cliques that span their domain.

Media profiles facilitate communication between the clique space and devices that are operated from it. Each device would possess the client-side code to at least one media profile before it could be connected to the clique space system through a user's account. Each media profile would identify a known set of interaction parameters (a medium) to the clique space system, and would allow a collaboration's behavior to be reflected in the clique space to all other connected devices—including those that are incompatible.

The clique account is the user's login entry point to the clique space. The user connects one or more devices they possess through their clique space account, thereby associating each connected device with a single account and therefore, a single identifiable user. An account could be registered to operate within one or more clique spaces, and it would be envisaged that an account can be connected to multiple registered clique spaces simultaneously.

Used properly over clique space federation, an account can uniquely and universally identify an individual regardless of which devices and clique spaces they are using at any point in time. This scheme also decouples a user from both a device and a clique space so that ideally, a user may borrow a device, and only have to remember their clique account connection details to be identified on any clique space as the devices operator for the time for which they are using it.

Primarily allowing affiliate relationships that are flexible and able to be maintained across clique spaces, account profiles may also be used in a controlled environment to audit, control, and secure most aspects of an individual's user's conduct while participating. Ideally, while an account can be associated with multiple account profiles, any specific device may activate only one account profile at a time.

Account profiles can, for instance, control user activity within a clique space by restricting the formation of cliques to certain clique spaces. Account profiles also prevent connections over media otherwise known and permitted to operate over a clique space. Account profiles could be registered to operate within one or more clique spaces, allowing users to connect to multiple clique spaces simultaneously under the same account profile.

Cliques can form and disband in ad-hoc and uncoordinated ways. Such exchanges might be said not to be structured. However it would be envisaged that a collection of cliques over one or more media would require more structure and coordination that is dependent on the reason for the collaboration.

Restrictions are exerted on a collaboration (a collection of cliques governed by a collaboration profile) in terms of the media that cliques can form over and how participants may interact. A label can be used to record the rationale for the existence of a collaboration.

Clique owners can drop or enforce clique-scoped constraints at any time unless a similar constraint prohibits this from occurring. If ownership should cede to another participant, the ability to drop and enforce a collaboration profile passes to that owner. If none of the remaining participant accounts can assert the collaboration profile, the clique space may drop the profile, retaining the clique-scoped constraints enforced by the profile. Alternatively, the ceding owner's clique space may disband all or some of the associated cliques as appropriate.

A clique is the intersection of account profile, media profile and optional collaboration profile constraints of a group of users who wish to participate in a single collaboration channel over one or more clique spaces. The account responsible for initiating the clique is appointed the clique owner. The clique owner will be arbitrarily reassigned if the existing owner leaves the clique.

Depending on the media selected, the clique space system may also use the clique owner's account to coordinate the state of a clique space with the device collaboration.

Cliques can have anonymous participants. These participants are not members of any clique space system or at least accessible to one or more other clique spaces in a federation. If anonymous participants are permitted (they are indeed another configuration constraint) they may join provided they wish to participate with a device that can satisfy all the fixed clique-scoped constraints that result from the intersection described.

Figure 3:
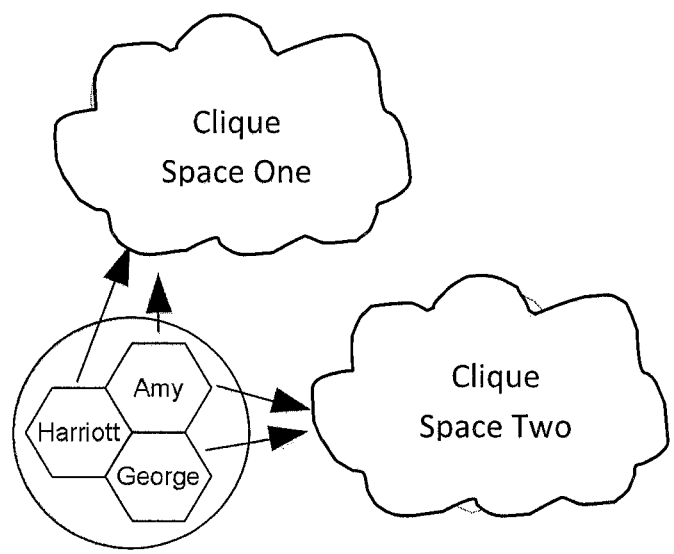
Figure 4:
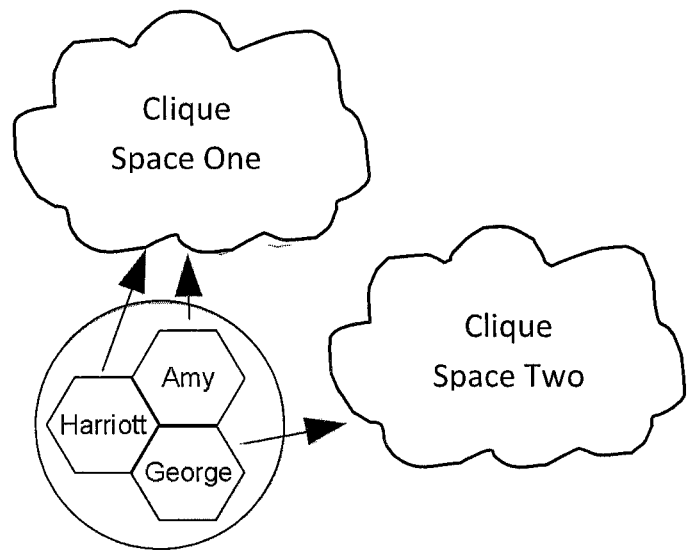

A clique can only spread into neighboring clique spaces if at least one account is connected to two or more federated clique spaces simultaneously, as FIG. 3 illustrates. However, once a clique is established over multiple clique spaces, it remains visible to all clique spaces from which participants are connected even after simultaneous connections either leave the clique, or disconnect from one of their clique spaces. FIG. 4 illustrates this point.

The visibility of the clique from both clique spaces is maintained so long as one or more connections from involved clique spaces remain as participants in the clique.

Figure 5:
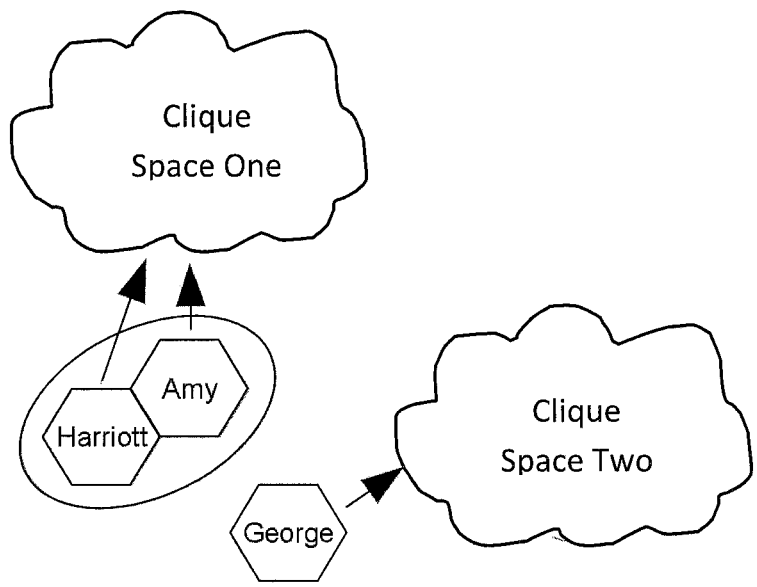

In the example used, George is the only participant connected to clique space two. If he leaves the clique, it looses visibility from within clique space two. This point is illustrated in FIG. 5.

Hence, if everyone connected to clique space 2 (including George) is not connected to clique space one, no one can participate in the clique that George left. This is because they cannot see it through their connection to clique space two. Assuming there are no other clique scoped constraints, the shortest way for George to become a participant in this clique again is when either Amy or Harriott open a simultaneous connection to clique space two or George opens a simultaneous connection to clique space one.

Different clique space component instances permit different ways of interacting, and these ways themselves, can be adjusted as suited. Clique-scoped constraints can be fixed in a clique by a collaboration profile, and in regard to a category of participant by an account profile. Clique-scoped constraints that are able to be varied may initially be done so by the clique owner.

Each element of the clique space may introduce constraints. In addition to clique scoped constraints, other components such as accounts, media, account and media profiles, and the clique space itself will introduce constrains of its own. As in a database management system, media profiles and their constraints are ultimately controlled by the administrator of the clique space.

Example 2

Figure 6:
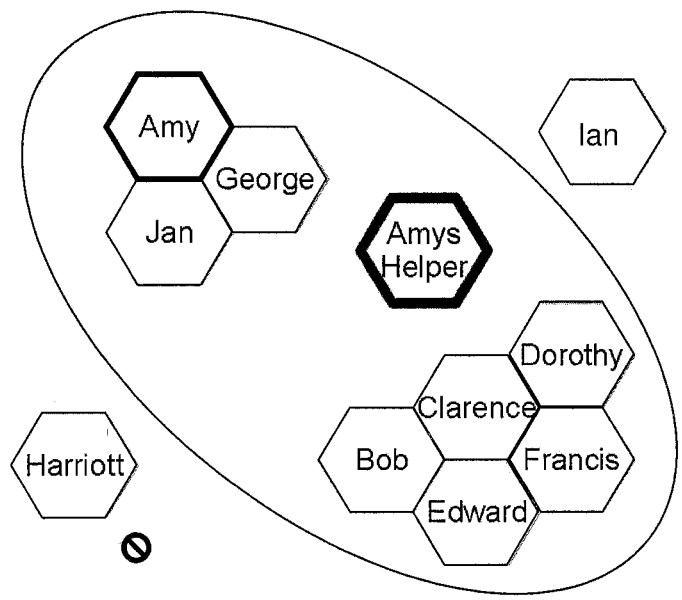
FIGS. 6 and 7 are a diagrammatic view of a membership or chip account of a real-time communication and information collaboration system in accordance with an embodiment of the invention.
Figure 7:
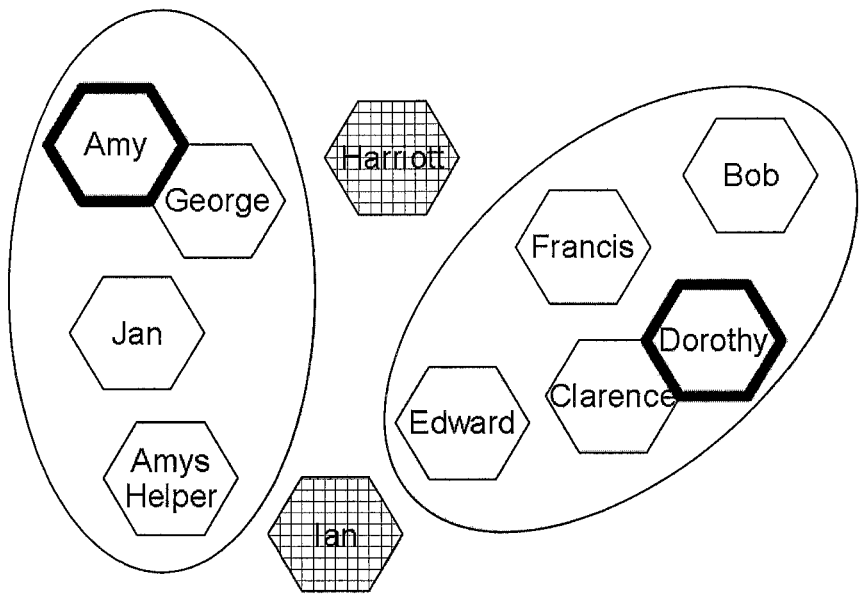
Figure 8:
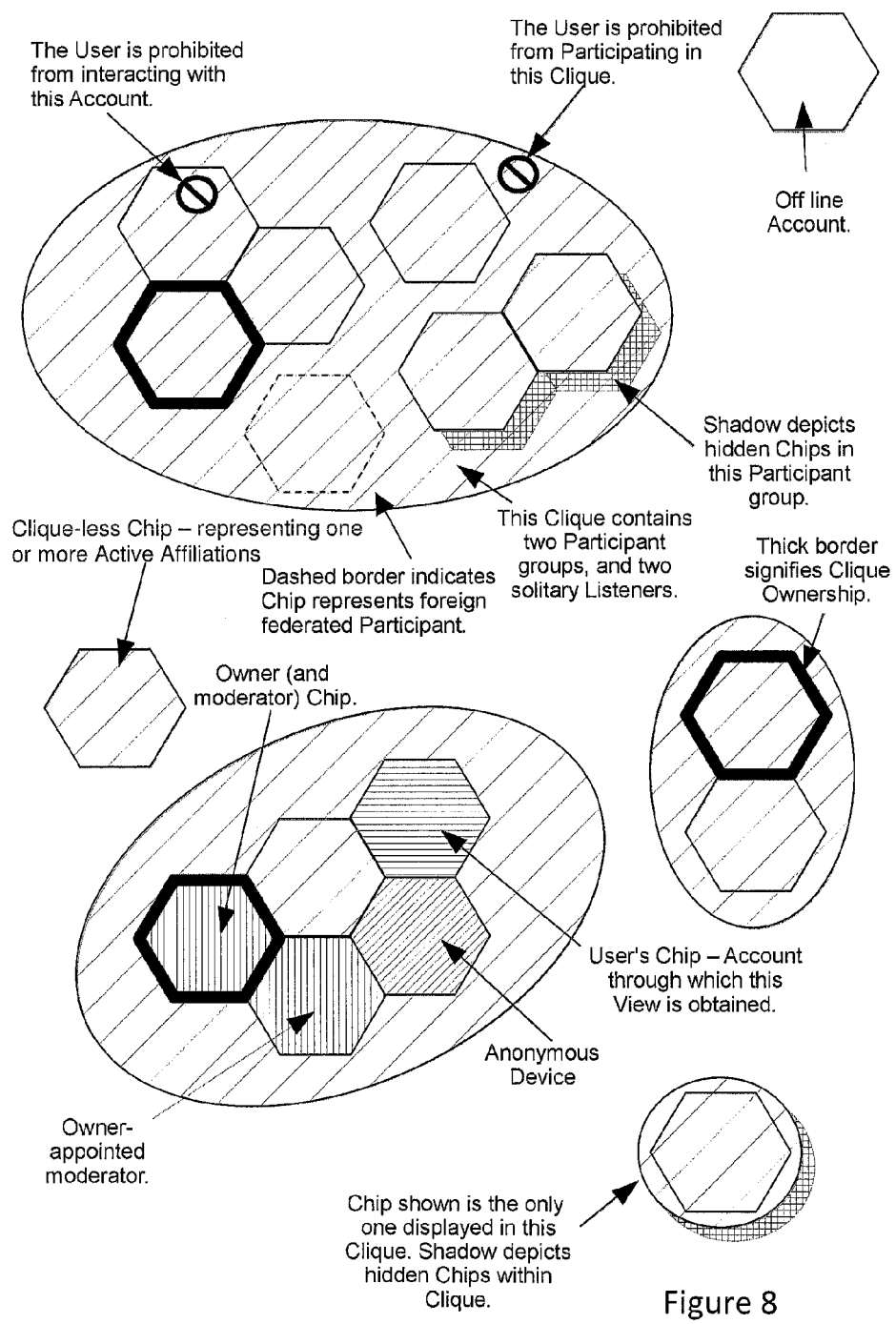
FIGS. 8 and 9 are a diagrammatic generalised view of a membership or chip account of a real-time communication and information collaboration system in accordance with an embodiment of the invention.
Figure 9:
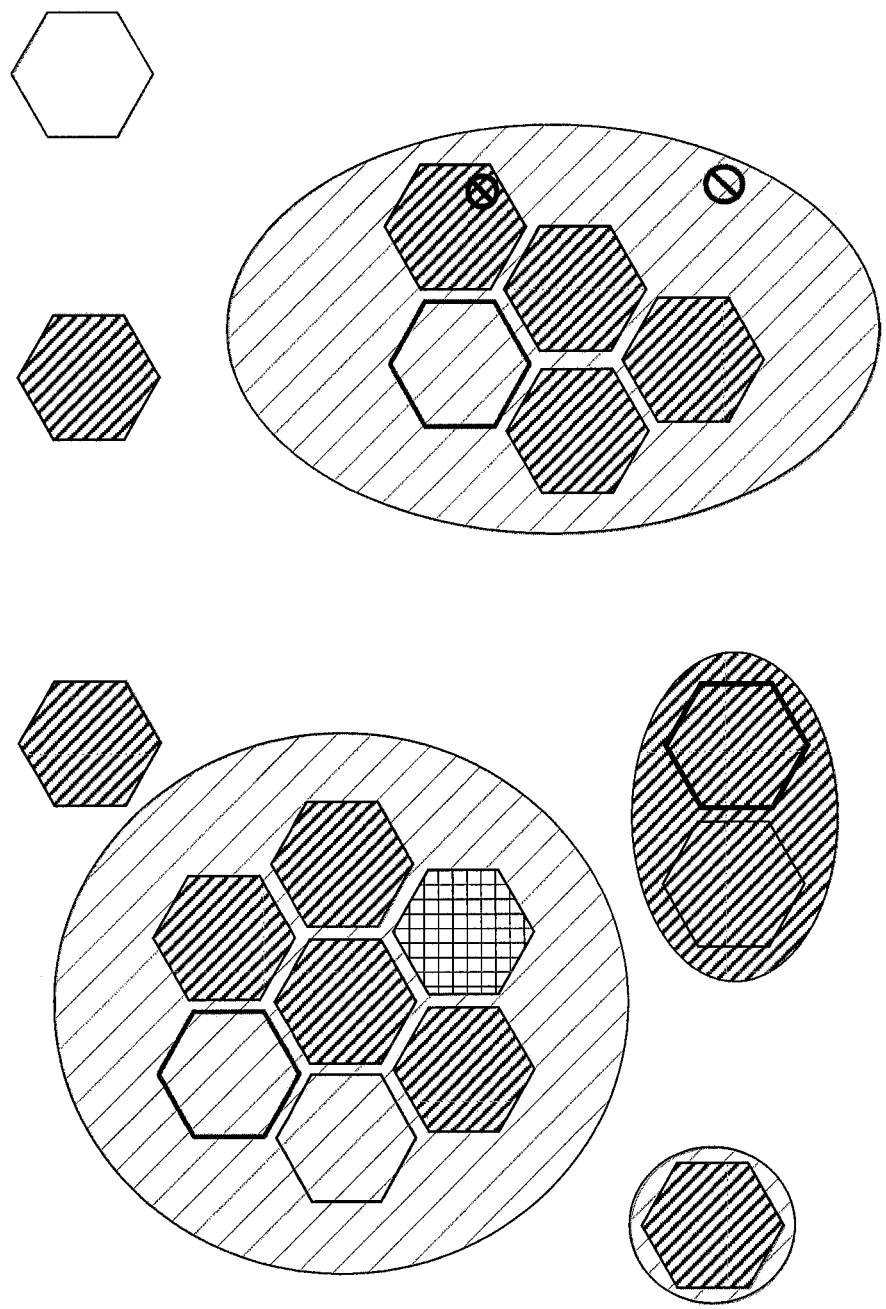
Figure 10:
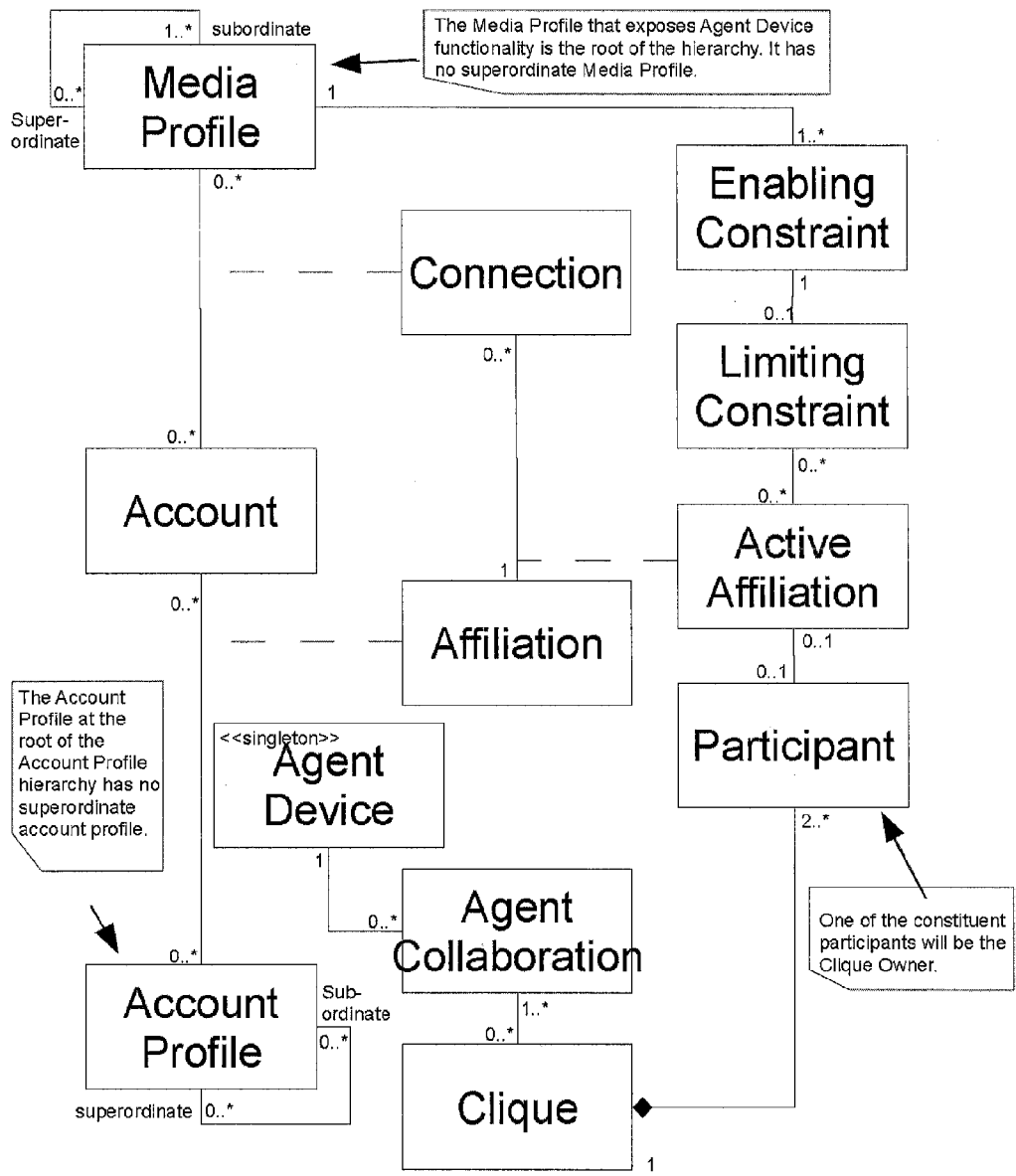
FIG. 10 is a diagrammatic view of the controlling software of a real-time communication and information collaboration system in accordance with an embodiment of the invention.

FIGS. 6 and 7 depict members of a project team who are physically separated. Clique space is here suggested as a viable solution to coordinate virtual collaborations that have to happen due to the fact that members of the team being considered are not collocated.

Collocation is considered useful by the project manager of this team only when the job function being performed requires a subset of the team to get together, and only for that subset and for that period of time for which collocation is necessary. Otherwise, collocating the team is actively avoided due not only to its logistic and financial impost, but because unnecessarily collocated resources tend, innocently but inevitably, to devote more time talking amongst themselves and therefore less time sharing their knowledge with the rest of the team.

Collocation is used as a tool early in the formation of a team while overall routines are being established, and once about every month or so to strengthen bonds of the team members. Collocation for these reasons is not considered further in this example.

Common ICT media are regularly engaged to facilitate communication between two or more people. Where available (in almost all cases) the collaboration is moderated over a clique space system. The system verifies the identity of the participants. A clique space also permits, prohibits or mandates collaborations from taking place over the moderated media according to rules imposed at various relevant levels within the system. Users can represent themselves as project members when, following connection to a clique space, they elect to activate an account profile association, created for them by the project manager.

For simplicity, it is assumed that in this example clique space systems are in wide use. Hence, it is generally accepted that if one isn't using ICT media through a clique space system (or from one that is reachable from the clique space that another user is connected to), neither party can trust the identity of the other, and no collaboration will ensue.

Amy manages a small team that is engaged in developing a software solution for another organization. She desires that her team members be mindful of the fact that they should associate their clique space account profile for, and only for project related activity. She can record clique space and media activity and media activity of any accounts while they use a clique space account profiles that she has defined for her project.

She wants collaborations in her project to be limited to media that are a nice balance between being flexible and controllable, while providing standard audit methods that apply to some generic format for that media. She also desires the existence of a single time line through which the team can track collaborations so that an action replay can be made of the collaboration in case something about the action that was missed can be picked up at a later time.

Of course, Amy cannot prevent collaborations from happening by team members when they are using other account profiles. However, the team is reminded that these contributions cannot ordinarily be recorded and used as remunerations for the members concerned, estimates of project progress, or as costing estimates to the client.

Team members may interact with users who hold account profiles outside of the account profiles managed by Amy because members, in using their own initiative, may from time to time need to go outside the team bounds to do their job.

When an outside account is engaged in a clique with one or more team members, these conversations will be logged by Amy's project and subject to audit like any other. If a team member's account participates in activity using a foreign account profile however, they will not be logged, and will be deemed external to the team for that interaction. Taking note of the interaction for the purposes of remuneration, progress, or costing will be at Amy's discretion.

Her supervisory power is absolute. Absolute, also, is her circle of knowledge. She will not know that any activity external to the team took place while a team member was actively affiliated with an account profile that is not managed by Amy. She will not be in a position to record clique space activity that transpires outside of her collaboration profile, and she does not record any media activity that similarly transpires when team members are not actively affiliated with an account profile she has permitted for them.

The public clique space is a generally available area that any user in the world, having access to a public account, can connect most devices over most network topologies. Account registration incurs a nominal fee that is renewed each year. Many governments in fact bare this expense to set up free public accounts for their citizens, so citizens can draw government services through these accounts. Accounts like these are generally trusted with more certainty than paid accounts because their sponsorship (a sovereign and hopefully stable government) is indicated as a property of the account.

The public clique space is euphemistically recognized as "the street" because people have come to associate the act of connecting to a private clique space system through it with the metaphorical act of coming in off the street through the foyer of a traditional office building. Hence, many private clique spaces have also used the term "the foyer" to describe the clique space that connects them (directly) to the street.

A user can take a recording of their own clique space activity by listening to a special clique designed for this purpose. This clique is owned by the clique space system. The activity stream is generated and maintained in or close to real time. The street keeps a short backlog of activity of several hours, but it is the responsibility of the users to take this information while it is available. Organizations that run their own clique spaces have to manage their own clique space activity stream. An activity stream produces a log of activity specifically over the clique space that an account is connected to, and cannot report activity for any other clique space unless the administrators of both clique spaces have come to some form of arrangement. Extracting the activities of a group of one or more users is permitted in certain circumstances, and Amy makes of these circumstances when she records media activity of her project members while they are actively affiliated.

For this example, Amy has decided to set up shop on the street. She does not have the business requirements to justify setting up her own separate clique space. In deciding not to administer her own clique space, she forgoes the advantages, the frustrations, and the expense of administering the media profiles or accounts on the clique space directly. This is because the administrators of the street do this for her.

The street's administrators do not grant permission to anyone but themselves to directly modify the street's media profile hierarchy. Similarly, they do not grant access to anyone but themselves and the account holder for account and collaboration profiles. Because Amy will not be using any media that are not known to the street, she has no need to set up her own clique space and pay to federate it to the street.

Hence, the street provides the necessary components that she can use to construct her account profiles and collaboration profile. In her instance, her account and collaboration profiles are intentionally simple and not hierarchical: four account profiles labelled Amy's Project Manager, Amy's Project Member, Amy's Project Customer, Amy's Project Admin, and one collaboration profile labelled Amy's Project. These labels are arbitrary, but meaningful to Amy.

Amy is now set to create account profile associations. The street charges a small fee for theses as this gives the street a source of income, and is a good way to minimize misuse, and prevent stability becoming an issue on the street's clique space system. Amy associates the account profile Amy's Project Member to government sponsored accounts for Bob, Clarence, Dorothy, Edward, Francis, George and Harriott— the remaining seven team members of Amy's IT development team. Amy has two customer representatives—Ian and Jan, which she has associated to the Amy's Customer account profile.

Finally, Amy creates an account (and pays a nominal fee to the street for the purpose). She uses this account primarily to record cliques that form over any authorised media by any of the project team members. She names this account Amy's Helper, and associates it with the Amy's Project Admin account profile. Amy also uses this account to register her email server so she can track email traffic.

In emulating the team room environment there are clandestine listeners. IT development relies on the close cooperation of individuals such that ideas not only be pass between participants who are actively collaborating, but that these ideas have the opportunity to be picked up by others through an osmosis that can only happen if the exchange is being clandestinely listened to by the whole team. The prime method of communication in this virtual team through which this osmosis occurs is via Internet telephony.

Firstly, Amy needs to declare that she needs a multi-channel VOIP device (she has chosen Skype for herself) to help the team cooperate amongst themselves, and with the customer in mixed media cliques. A media profile identifies Skype specifically, but she decides to opt for the parent profile Multi Channel VOIP to cover the fact that other people may use different but compatible VOIP software to participate in an exchange. This media profile exposes a subset of functional constraints common to all.

Amy wants the VOIP software to behave in such a way that when any subset of team members start participating in a VOIP conversation, the conversation can be overheard by the remaining users in the team—albeit at a lower than normal volume as if the conversation where happening somewhere not quite within the immediate proximity to the listeners. Generally, listeners can interject (in which case foreground volume is set), and leave a conversation (in which case background volume is restored) at will.

Clique space allows such a mechanism to function by stating in the collaboration profile (Amy's Project) that if any account registered with Amy's Project Manager, Amy's Project Customer, and Amy's Project Member starts a clique using the Multi Channel VOIP media, and then register all other Accounts within any of the above account profiles as listeners at the background volume.

Amy wishes that Amy's Helper account owns the Multi Channel VOIP clique. It asserts ownership by being the account that forms the clique over this medium. It holds ownership indefinitely. A collaboration profile constraint prohibits all other accounts claiming ownership.

The collaboration profile asserts that Amy's Helper, upon connecting to the clique space and associating itself to Amy's Project Admin, forms a clique with the Clique Hanger account. This account is special to the extent that it can participate with any other account irrespective of which media is used. FIG. 6 details what Amy's view of the clique space under Multi Channel VOIP media might look in one instant in time.

FIG. 6 shows that Amy and George are one group of participants. Bob, Clarence, Dorothy, Edward, and Francis are another group of participants. The account Amy's Helper is the clique owner. The chip representing Amy's Helper has a shadow—as though something (the Clique Hanger participant in this case) is hiding under it. All participant groups can listen to each other. Harriott is connected, yet neither listening nor participating in this clique. Ian has not connected.

Completing the team room environment are the features of pair programming and asserting the simultaneity of media use. Pair programming is a term used to describe sharing one editor environment between two programmers to facilitate quicker and more robust development iterations. In addition to the pair programmers themselves, one could assume that other people can become interested onlookers in a pair programming session.

Amy has chosen Net Beans for her programming environment. This package has a remote pair-programming module, and this example assumes that a media profile (Net Beans Pair Programming) that enables a clique space system to interface with it is also available. This media profile has been installed on the street, and Amy chooses to use it in her project.

In Amy's Project collaboration profile, Amy asserts that all accounts in Amy's Project Manager must connect to the Net Beans Pair Programming device profile before they can either form or join cliques using this device profile. Users will therefore be unable to form and join cliques on the street using the account profile Amy's Project Member unless this happens first.

A similar assertion is made with the Multi Channel VOIP media profile for Amy's Project Manager, Amy's Project Member, Amy's Project Customer and Amy's Project Admin account profiles.

FIG. 7 shows a simultaneous view of what is going on with the Net Beans Pair Programming medium for all accounts associated with Amy's Project in FIG. 6. Neither Harriott, nor Ian is connected to a device that supports the Net Beans Pair Programming media.

In FIG. 7, the clique on the left of the Amy's view displays two participants: Amy (the clique's owner) and George. Jan is a listener. The Amy's Helper account is a listener in both cliques, but it not displayed in the clique on the right. As a consequence, the clique on the right has a shadow. The clique on the right is a pair programming session between Clarence and Dorothy with Edward, Francis and Bob looking on.

FIG. 6 shows that Harriott's account is not listening or participating in the clique. Furthermore, Harriott's chip indicates that Amy is unable to form a clique with Harriott through this medium. This is because FIG. 7 shows that Harriott has not associated Net Beans Pair Programming media. She does not fulfill the requirement that she be simultaneously connected and actively affiliated to her account profile through both Net Beans Pair Programming and Multi Channel VOIP media.

In the case of Amy's IT development project, a telepresence environment (Generic Tele Presence) or a telephone (Generic Telephone) are permitted but not mandated, so users can interact with other media on the clique space without connecting these media.

The Generic Tele Presence profile can be used by team members when physically together and the customer's executive team wishes to be briefed about the project's status. Mobile or landline phones (PSTN Line media profile—inherited from Generic Telephone) can be used by team members to have conversations between external parties where the conversation is believed not to warrant the collocated involvement of other team members.

Hence, it should be noted that Generic Telephone, Generic Tele Presence, and Multi Channel VOIP all share a usage relationship that is expressed in the media profile hierarchy. Amy uses this relationship to her project's advantage and does not attempt to prevent all three media being used in a single clique when the situation can accommodate the constraints of all three media profiles simultaneously.

In asserting the collaboration structure it is important to recognize that an assertion to apply the rules of Amy's Project Collaboration would need to be placed in each of Amy's account profiles to behave in accordance to the constraints listed in the Amy's Project collaboration profile. This ensures each user that associates their account through an account profile administered by Amy follows Amy's wishes regarding how she wants her project members to interact. No media profiles except Multi Channel VOIP, Generic Tele Presence, Generic Telephone, and Net Beans Pairs Programming are permitted to be used by Accounts connected under the Amy's Project Manager, Amy's Project Members, and Amy's Project Customer account profiles. The media profiles Generic Email and Generic IM are also permitted, and are included in this list.

The Amy's Helper account (associated with Amy's Project Admin account profile) can only be a listener in cliques formed by other accounts in Amy's Project under any media so permitted by this collaboration profile. Additionally, any other account can form a clique with Amy's Helper under the Multi Channel VOIP medium. When this happens, all other accounts are registered as listeners to this clique at full volume. This allows the team members to use Amy's Helper as a virtual soapbox, and to make general announcements to the whole team.

Accounts associated with the Amy's Project Customer account can only be listeners in cliques formed under the Net Beans Pair Programming media profile.

The process of the street, Amy's email and IM servers, and registering a service on a clique space is described. Amy decides to create email and IM accounts using her Internet domain, and host email and IM on her own servers. Additionally, she asks every user who holds and association to the account profile Amy's Project Member (Bob, Clarence, Dorothy, Edward, Francis, George and Harriott) to connect the street to their accounts through her account profiles and her email and IM services. A similar process might be followed by users of other services offered over other media such as web services.

This action confers some extra audit and security advantages for Amy because this action completes her wish to have one log which records all collaborative activity on her project—the clique space activity log. With the clique space activity log, she now has one chronological time line to work from, and she and the other team members can study and cross reference what transpires in the clique space activity log with recordings from other media.

Additionally, registration of email as a clique space service on the street allows the email service to be used over any device that can interact with the email services without having to interface those devices to the clique space. Hence, Amy doesn't have to worry about permitting more devices and hence media profiles to send and receive email.

The street possesses a media profile that can track the address of sent and received email and IM messages using the media profile (Generic Email and Generic IM respectively) that is connected to Amy's and many other email servers. Because of this, and because the street is a well known and used for this, Amy decides to configure her collaboration profile so that it does not send email to, or receive email from an address that is not similarly registered to an account connected to the street, or reachable from the street by another federated clique space system. The team therefore has a means to validate the credentials of accounts through which email and IM is sent and received.

Emails and IM's sent and received generate clique space activity with regard to the project member's connection formed with the corresponding media. This activity is picked up by the logging software connected through the Amy's Helper account. Having email registered in this way also allows the email servers to validate their user accounts against the credentials of the corresponding user's street account. So, instead of giving her staff another user name/password combination to remember, she sets up her email accounts so they authenticate against the user's street credibility.

Attention now turns specifically to the street's activity log and how it is configured to record clique space activity for Amy's project. Like the media it interacts with, Clique Space is a real-time system. Therefore, a device used to capture clique space activity can be encapsulated in a media profile and hence, this device can be connected to the clique space in the same ways as any other. A user can use the clique space activity service to listen to the stream of activity through the media profile Generic Clique Space.

The street is so configured so that no account or collaboration profile can prohibit another account from listening to their activity from the Clique Space Activity Log account profile. Hence, a user who wants to record their account's activity can do this, regardless of which account profile they may use.

Devices connected to the street through Clique Space Activity Log, which are also affiliated to the account "Self" will get activity through any other accounts' connections regardless of which account profile the other connections might be affiliated with.

Any activity from any account that is registered on a clique space will (unless prohibited by administrators) be reported through the device associated with the Generic Clique Space media profile. Like most other devices, merely connecting a device through this media profile to the clique space is insufficient to begin receiving this information.

A collaboration profile can be configured such that an arbitrary level of activity of one or more of the containing account profiles happening in the collaboration can be reported. Amy chooses to comprehensively log all activity over Amy's Project collaboration profile to accounts associated with the Amy's Project Admin account profile.

Amy connects a clique space activity recording device to the street through the account Amy's Helper. The account will not record anything until Amy affiliates this connection to the Amy's Project Admin account profile. When Amy does this, the street picks up the fact that Amy's Project Admin asserts the collaboration profile Amy's Project. The street looks at this collaboration profile for what to do with a connection to the Generic Clique Space media profile under the Amy's Project Admin account profile and observes that the collaboration profile instructs the street to comprehensively log all collaboration activity from all accounts using all of Amy's project account profiles.

In this case, the street complies, and the Amy's Helper account is registered as a listener in a clique over the Generic Clique Space media profile with a clique that is owned by the Clique Space Activity Logger—the account that owns the Clique Space Activity Log account profile. Amy's Helper will capture all clique space activity that happens to any account affiliated to an account profile associated with Amy's Project.

The clique space activity log only captures information about an exchange that is sent over the clique space. Usually, this information is relevant only to the operation of the clique space in relation to a medium. As such what actually transpires over the selected medium often is not conveyed over the clique space, and therefore not picked up by the clique space activity log. The street's administrators also eliminate information that does not relate to the orderly operation of a medium on the street because of the traffic burden this places on the street's clique space system. In order for Amy to capture the maximum content of a collaboration, she must supplement the information the clique space does not capture, through her own media logging software.

All media that Amy permits in her project are recorded in this way. She uses her Amy's Helper account where the medium permits, to record the content of collaborations that don't get picked up by the clique space activity log. The activity log is just a text based data stream of information relating to device activity. Hence, in many circumstances, it would be impractical to translate collaboration within the device's medium to a form that could be transmitted through the clique space activity log.

In summary it can be seen from the above description and examples that use of the invention addresses the following high-level requirements:

1. provide an environment where existing and future collaboration media can be integrated within a standard layer of discovery, control, and activity logging;
2. remove technological barriers that prevent people with varied media from finding other people with similar or compatible media with whom they wish to collaborate;
3. assist the users in finding an appropriate collaboration medium;
4. allow users to be identified though their affiliation with an employer, club or social organisation, educational institution, government, emergency, or welfare service, etc.;
5. provide a powerful native potential to audit use of varied collaborations through an integrated media activity logging mechanism which is independent of the media used;
6. represent collaborations involving multiple participants and listeners visually;
7. abstract, as much as possible from users of the system, the necessity of having to remember media specific connection procedures and contact lists;
8. permit, where possible and so authorised, information being clandestinely picked up by users not directly participating in a collaboration;
9. represent accounts as the individual user, assigning the user an identity which is separate from the particular media a user may engage, and affiliations against which a user may represent from time to time;
10. secure, centralise, and protect from falsification, the identity of users, and who they can be acting on behalf of;
11. allow "anonymous" users who do not possess a connection to the collaboration mediation system described herein to participate in collaborations that are mediated by this system;
12. protect collaborations that have formed inside the system from exploitation by such anonymous users previously described without necessarily preventing these users from joining a managed collaboration;
13. implement, at any conceivable level, protocol that will moderate collaborations and user awareness;
14. facilitate the collaboration interface—removing the necessity of device vendors to provide this environment and to encourage users to use their device through it; and
15. be highly scalable, configurable, adaptable, and robust.

While we have described herein a particular embodiment of a real-time communication and collaboration system, it is further envisaged that other embodiments of the invention could exhibit any number and combination of any one of the features previously described. However, it is to be understood that any variations and modifications can be made without departing from the spirit and scope thereof.

The preferred embodiment of the invention is described above in the Drawings and Description of Preferred Embodiments. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s). The foregoing description of a preferred embodiment and best mode of the invention known to the applicant at the time of filing the application has been presented and is intended for the purposes of illustration and description. It is not intended to be exhaustive or to limit the invention to the precise form disclosed, and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated.

The invention claimed is:

1. A real-time communication and Information collaboration system including:
   one or more user accounts, the one or more user accounts being associated with respective one or more users, the user's account being administered by the user to control aspects of client collaboration formation;
   one or more client devices for participating in the client collaboration, such that client device interaction is controlled in an agent collaboration though an active affiliation that appears in the client collaboration as a participant, whereby an active affiliation is associated with the user's account and provides one or more connections and one or more affiliations;
   an agent device wherein agent collaboration aware client devices connect to the agent device, and one or more agent devices participate in one or more agent collaborations wherein the agent collaboration is a virtual environment in which the one or more users participate in client collaborations with the one or more client devices providing a physical environment which is implemented as a network of one or more agent collaboration agent devices;
   and wherein media profiles facilitate communication between the agent collaboration and the client devices such that each client device interfaces with at least one media profile before connecting to an agent collaboration through a user's account and each media profile identifies a known set of interaction parameters forming a medium, composed of one or more enabling constraints to allow the agent collaboration whereby the media profile allows a collaboration's media-specific behaviour to be reflected in the agent device.

2. A real-time communication and information collaboration system according to claim 1, the system further including a modeling and visual representation of client collaborations in an agent collaboration by providing a client collaboration chip which is an icon that represents the user's account on an agent collaboration view with one or more users registering interest in one or more other users' accounts by importing client collaboration chips into one's view of the agent collaboration and wherein each client collaboration is governed by a collaboration mode which identifies which of the one or more users are privy to its activity, and whether or not any of the one or more users are able to participate.

3. A system according to claim 2, wherein the system further includes a plurality of servers configured to be interconnected with each other to define the agent collaboration in which client collaborations can form via a networked connection to each other.

4. A real-time communication and information collaboration system according to claim 2, wherein the account profile is adapted to maintain record of details including, but not limited to, user details, account details, access and security permissions, details of associated communication devices and/or media profiles and any other suitable information.

5. A real-time communication and information collaboration system according to claim 1, wherein a representation of another's user's accounts is locatable and importable by one of the one or more users for collaboration with that another user.

6. A real-time communication and information collaboration system according to claim 1, wherein the system provides centralizing and abstracting the collaboration of the one or more users to form impromptu collaborations through any media the one or more users choose to use.

7. A real-time communication and information collaboration system according to claim 1, wherein the system determines similarities in managing collaborations from the media profiles, and provides an opportunity to display an identical and intuitive interface to the one or more users, the interface not dependent on the medium being used.

8. A real-time communication and collaboration system according to claim 1, wherein agent collaborations are modelled inside themselves as client collaborations.

9. A real-time communication and information collaboration system according to claim 1, wherein each of the one or more users has a client collaboration account and the user account is associated with at least one account profile.

* * * * *